Nov. 12, 1946.    B. J. HARDER    2,410,937
FERTILIZER DISTRIBUTOR
Filed May 30, 1944    2 Sheets-Sheet 2
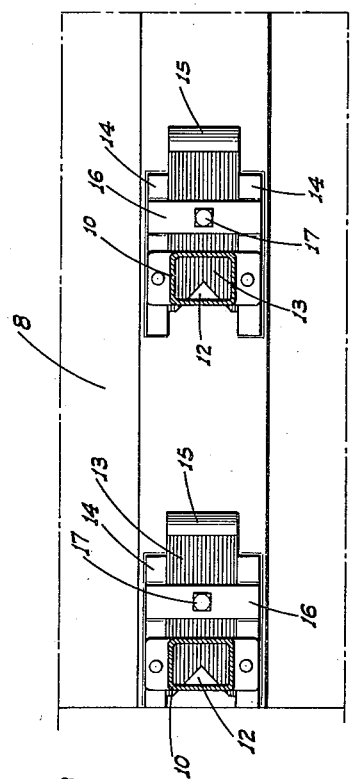
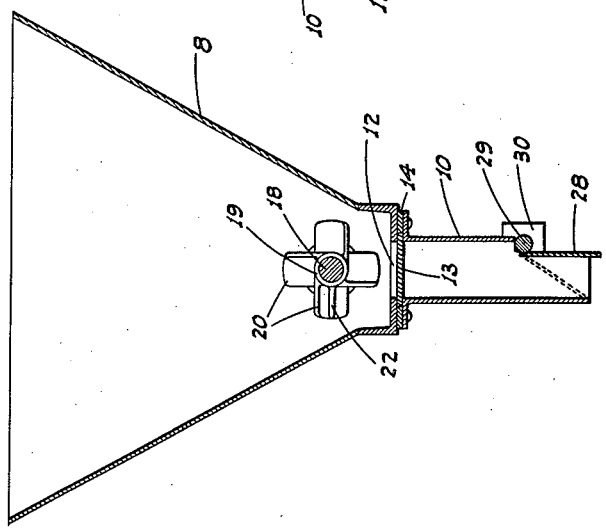
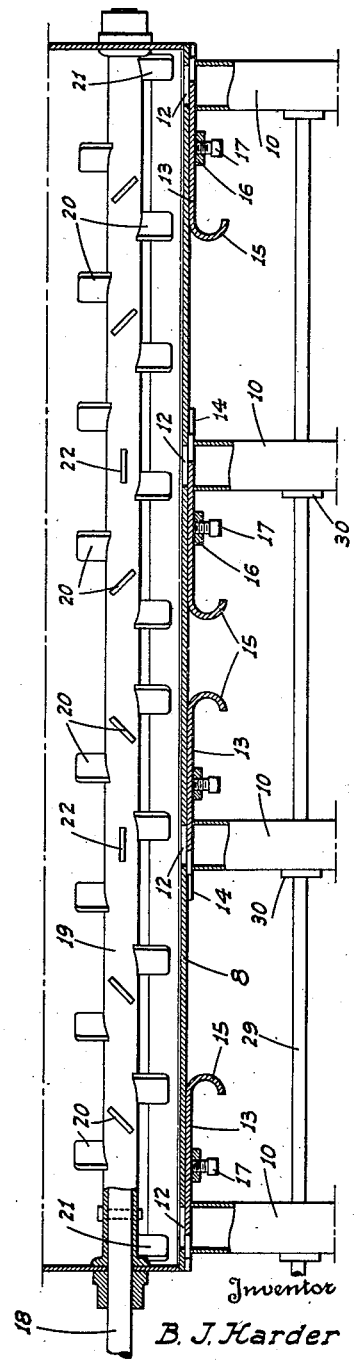
Inventor
B. J. Harder Patented Nov. 12, 1946

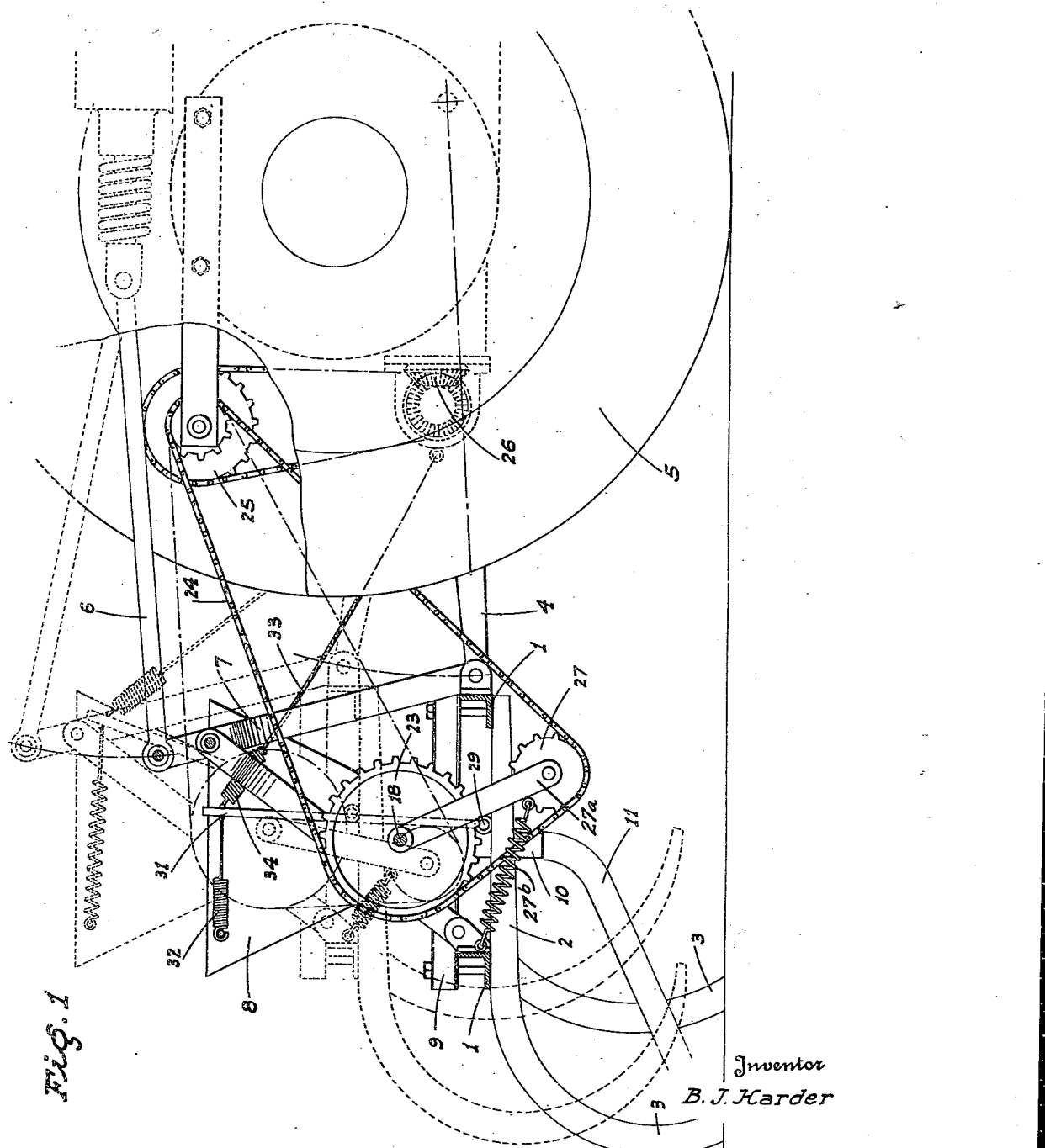

2,410,937

UNITED STATES PATENT OFFICE 2,410,937

FERTILIZER DISTRIBUTOR

Bernhard J. Harder, Delano, Calif.

Application May 30, 1944, Serial No. 538,005

5 Claims. (Cl. 275—2)

This invention relates to fertilizer distributors for use with a tractor drawn implement; major objects being to provide a distributor of this general character arranged so that different amounts of fertilizer can be selectively fed to the distributing spouts, and one having a means, driven from the tractor, for constantly agitating and moving the fertilizer along the hopper so that it will not cake and all the spouts will have ample fertilizer to draw from.

The implement to which my distributor is particularly designed to be attached is of a type adapted for connection to a Ford-Ferguson draft system, which enables the implement to be lifted from the ground whenever desired. Another object of my invention is to provide shut-off gates for the spouts separate from the main flow control means thereof, and a connection between these shut off gates and the tractor so arranged that as long as the implement is in working position, said gates will remain open but as soon as the implement is lifted, said gates will be automatically closed. In this manner, wastage of fertilizer is avoided, while the desired setting of the flow control gates of the different spouts need not be disturbed.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

Figure 1 is a sectional elevation of my improved distributor taken between the two hoppers thereof, and as mounted on a tooth cultivator attached to a Ford-Ferguson type tractor; the implement being shown in operative position in full lines and in raised position in dotted lines.

Figure 2 is a transverse section of the hopper showing the agitating means and a spout with flow-control and shut-off gates.

Figure 3 is a fragmentary bottom plan view of a hopper, showing the mounting of the individual flow-control slide gates for the spouts.

Figure 4 is a longitudinal section of one of the hoppers.

Referring now more particularly to the characters of reference on the drawings, the implement on which my distributor is mounted comprises transverse frame bars 1 which support the shanks 2 of the depending cultivator teeth 3. The forward bar 1 is connected to the lower draft arms 4 of a Ford-Ferguson tractor 5, the upper draft link 6 of which is connected to a V-strut 7 mounted on and upstanding from bars 1 centrally of the implement as usual.

My improved fertilizer distributor comprises a pair of identical transversely extending relatively long hoppers 8 supported by base bars 9 from bars 1 in crossing relation; the hoppers being necessarily spaced apart to miss strut 7, and for the placing of the agitator drive and gate control mechanism, hereinafter described, in a convenient position centrally of the tractor.

Depending from each hopper in proper relation to the corresponding teeth 3 are spouts 10, from each of which a flexible conduit 11 leads to the desired point of distribution, as is customary. The spouts of course communicate with the bottom of the hopper by ports 12 in the latter.

Between each port and its spout is a slide gate 13, movable lengthwise of the hopper between guides 14 on the outside thereof. At its outer end, the gate is formed as a pull handle 15, and between said handle and the spout a cross bar 16 straddles the gate, having a set screw 17 so that after the gate has been slid to any desired adjusted position, it may be locked against undesired shifting from such position. Since each spout has its own gate, the flow from each may be individually controlled as may be desired.

Projecting through both hoppers from end to end thereof near the bottom, and across the space therebetween, is a shaft 18. Fixed on the shaft within each hopper and extending from end to end thereof is a sleeve 19 projecting from which are agitating and conveying vanes or paddles 20. As shown in Fig. 4, these vanes are arranged spirally about the sleeve, and are disposed in oppositely pitched relation from a point centrally of the length of the hopper, so as to move the fertilizer in opposite directions from the middle toward the ends of the hopper. At each end of the hopper, a single vane 21 is mounted on the sleeve in oppositely pitched relation to the adjacent vanes 20, so as to prevent possible banking and packing of the fertilizer at that point. Also mounted on the sleeve directly over each port 12 is at least one non-pitched vane 22, extending axially of the sleeve and acting to agitate the fertilizer above the port so as to insure a proper breaking up of the fertilizer and a ready movement of the same through the port and corresponding spout.

As shown in Fig. 1, the shaft 18 is driven from the tractor by means of a sprocket 23 on said shaft between the hoppers, which is engaged by an endless chain 24 forming part of a chain drive unit 25 driven by a suitable gearing connection with the rear-end power take-off shaft of the tractor, as indicated at 26. A swinging arm 27a is journaled at its upper end on the shaft 18. At its lower end said arm carries an idler sprocket 27 engaging the chain 24. A tension spring 27b is interposed between the lower end of the arm and the frame 1 and exerts a constant pull on the arm and idler sprocket to thereby maintain the chain 24 taut in all positions assumed by the frame and distributor relative to the tractor.

In order that all the spouts shall be automatically closed whenever the implement is lifted from an operating to a non-operating position, the following arrangement is provided:

Each spout 10 is cut away on its forward side upwardly from the bottom a certain distance, as shown in Fig. 2, and a gate 28 is mounted in said cut away portion in a normally straight depending position to take the place of the cut away front side portion of the spout. The gates of all the spouts of each hopper are connected along their upper edges by a shaft 29, journaled in plates 30 mounted on the spouts.

At the laterally inner end of the hopper, the shaft is secured to an upstanding lever 31 to which a tension spring 32 is connected (see Fig. 1), which acts to pull said lever rearwardly and thus maintain the gates 28 in a forwardly swung or open position. A flexible element 33 which includes a tension spring 34 stronger than spring 32, extends forwardly from the lever to connection with the tractor at a point thereon such that when the implement is lowered to working position the element 33 is slack, but when the implement is lifted clear of the ground, the element is tensioned and the lever 31 is pulled forwardly, as indicated in dotted lines in Fig. 1. This movement of the lever turns the gates 28 to a closed position against the back of the spouts, as indicated in dotted lines in Fig. 2. The purpose of spring 34 is to prevent possible bending of the gates, or breakage of element 33, with tensioning of the latter by relative tractor and implement movement, after the gates are fully closed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A fertilizer distributor comprising, with a tractor, a hopper, means to mount the hopper in supported draft relation to the tractor and for raising and lowering movement relative thereto, spouts depending from the hopper, normally open closure gates for the spouts, and means between the gates and tractor to close said gates upon lifting movement of the hopper a predetermined distance.

2. A distributor as in claim 1 with separate individually adjustable gates for the spouts, independent of the first named gates.

3. A fertilizer distributor comprising, with a tractor, a hopper, means to mount the hopper in supported draft relation to the tractor and for raising and lowering movement relative thereto, spouts depending from the hopper, closure gates for the spouts depending down the front side thereof in normally open position, a turnable shaft connecting all said gates along the top, a lever upstanding from the shaft at one end of the hopper, means yieldably acting on the lever to pull the same rearwardly and maintain the gates swung forwardly and open, and a connection between the lever and tractor to pull the lever forwardly upon lifting of the hopper a predetermined distance from an operative position.

4. A fertilizer distributor comprising, with a tractor, a hopper, means to mount the hopper in supported draft relation to the tractor and for raising and lowering movement relative thereto, spouts depending from the hopper, closure gates for the spouts depending down the front side thereof in normally open position, a turnable shaft connecting all the gates along the top thereof, a lever upstanding from the shaft, a spring pulling back on the lever, and a flexible element connecting the lever and tractor at a point on the latter such that upon lifting movement of the hopper, the lever will be pulled forwardly against the resistance of the spring.

5. A structure as in claim 4, with a tension spring stronger than the first named spring, interposed in said flexible element.

BERNHARD J. HARDER.